United States Patent
Mittricker

(12) 
(10) Patent No.: US 6,858,049 B2
(45) Date of Patent: Feb. 22, 2005

(54) METHOD FOR UTILIZING GAS RESERVES WITH LOW METHANE CONCENTRATIONS FOR FUELING GAS TURBINES

(75) Inventor: Frank F. Mittricker, Houston, TX (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 0 days.

(21) Appl. No.: 10/431,001

(22) Filed: May 7, 2003

(65) Prior Publication Data

US 2003/0188536 A1 Oct. 9, 2003

Related U.S. Application Data

(62) Division of application No. 09/460,148, filed on Dec. 13, 1999, now Pat. No. 6,585,784.

(51) Int. Cl.$^7$ ................................................ C10L 3/10
(52) U.S. Cl. ................... 48/127.7; 48/127.1; 48/127.3; 48/127.5; 48/197 R; 48/198.2; 48/198.3; 48/198.7
(58) Field of Search .............. 48/127.1, 127.3, 48/127.5, 127.7, 197 R, 198.2, 198.3, 198.7

(56) References Cited

U.S. PATENT DOCUMENTS

| | | | |
|---|---|---|---|
| 3,418,082 A | 12/1968 | Haar | 23/213 |
| 3,653,183 A | 4/1972 | Sanders et al. | 55/56 |
| 4,091,086 A | 5/1978 | Hindin et al. | 423/648 R |
| 4,132,065 A | 1/1979 | McGann | 60/39.02 |
| 4,171,258 A * | 10/1979 | Gaspar | 208/144 |
| 4,299,086 A | 11/1981 | Madgavkar et al. | 60/39.06 |
| 4,305,733 A | 12/1981 | Scholz et al. | 48/196 |
| 4,363,361 A | 12/1982 | Madgavkar et al. | 166/256 |
| 4,366,668 A | 1/1983 | Madgavkar et al. | 60/39.06 |
| 4,383,837 A | 5/1983 | Smith | 48/197 R |
| 4,421,535 A | 12/1983 | Mehra | 62/17 |
| 4,423,155 A | 12/1983 | Bell et al. | 502/38 |
| 4,483,943 A * | 11/1984 | Windawi et al. | 502/342 |
| 4,496,371 A | 1/1985 | Urban et al. | 48/197 |
| 4,595,396 A | 6/1986 | Erdman | 44/63 |
| 4,623,371 A | 11/1986 | Mehra | 62/17 |
| 4,631,915 A | 12/1986 | Frewer et al. | 60/39.12 |
| 4,861,745 A | 8/1989 | Huang et al. | 502/314 |
| 5,516,967 A | 5/1996 | Pandey et al. | 48/198.1 |
| 5,725,616 A | 3/1998 | Lynum et al. | 48/127.3 |
| 5,741,440 A | 4/1998 | Cooper et al. | 252/373 |
| 5,927,063 A | 7/1999 | Janda et al. | 60/39.02 |
| 6,293,979 B1 | 9/2001 | Choudhary et al. | 48/198.7 |

FOREIGN PATENT DOCUMENTS

| | | |
|---|---|---|
| EP | 0351094 | 3/1994 |
| EP | 0723068 | 7/1999 |
| GB | 2085314 | 4/1982 |

\* cited by examiner

Primary Examiner—Jerry D. Johnson
Assistant Examiner—Basia Ridley

(57) ABSTRACT

The invention is directed to a method of fueling gas turbines from natural gas reserves with relatively low methane concentrations. The invention permits the use of such reserves to be used to fuel gas turbines to generate electric power. The method of the invention includes providing a natural gas comprising not more than about 40 percent methane on a volume basis and mixing the methane of the natural gas with hydrogen gas to provide a hydrogen enhanced methane/hydrogen gas blend which has sufficient hydrogen to provide flame stability during burning. Thereafter, if required, the hydrogen enhanced methane/hydrogen gas blend is dehydrated to remove a sufficient amount of water to provide a flame stable hydrogen enhanced dehydrated methane/hydrogen gas blend. The hydrogen enhanced natural gas blend is used to fuel gas turbine generators.

8 Claims, 1 Drawing Sheet

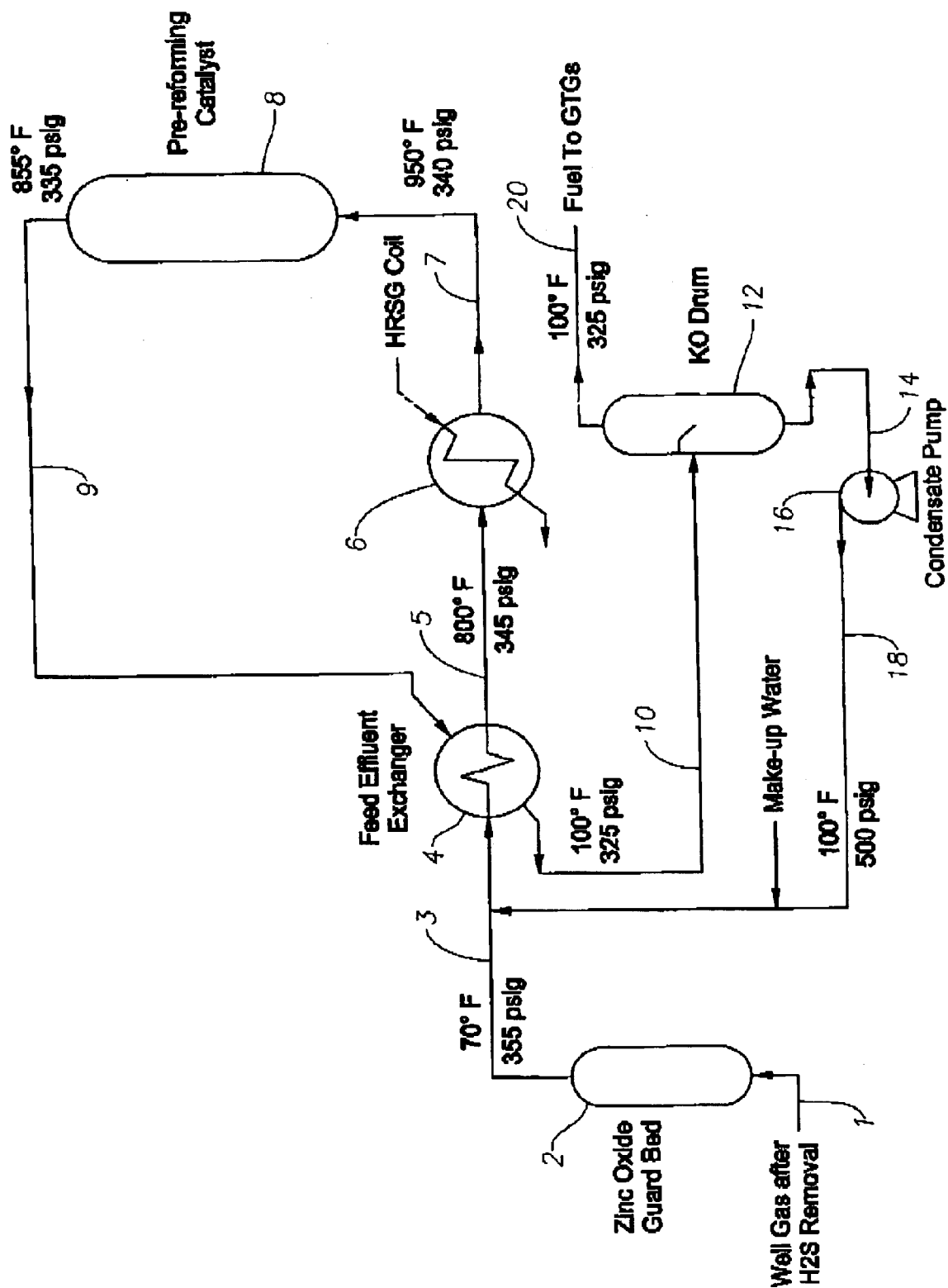

METHOD FOR UTILIZING GAS RESERVES WITH LOW METHANE CONCENTRATIONS FOR FUELING GAS TURBINES

This application is a Divisional of U.S. application Ser. No. 09/460,148, filed Dec. 13, 1999, now U.S. Pat. No. 6,585,784, the entire disclosure of which is incorporated herein by reference.

This invention relates to the combustion of natural gas having low methane concentrations and, without the invention, having a low heating value for the economic generation of power from gas turbines. More particularly, this invention relates to the combustion of a gas blend with a methane gas concentration of not more than about 40 volume percent, based upon the total volume of the gas. The gas blend includes hydrogen gas to increase the combustibility of the gas blend.

BACKGROUND OF THE INVENTION

Currently there are substantial methane gas reserves with relatively low methane gas concentrations. Many of these reserves have methane gas concentrations below 40 volume percent. Currently, impurities are removed from natural gas to make pipeline quality natural gas which normally have methane concentrations of from about 95+ to about 99+ volume percent. To fuel gas turbines to make electric power, converting natural gas having methane concentrations of not more than about 40 volume percent methane to pipeline quality natural gas becomes economically impractical because the conversion is capital intensive. Moreover, natural gas with methane concentrations of not more than 40 volume percent does not provide a reliable fuel source for gas turbines to generate power because natural gas with such low methane concentrations will not provide a stable flame for fuel combustion without special catalysts and without special balancing of oxygen with other combustibles.

SUMMARY OF THE INVENTION

The invention is directed to a method of fueling gas turbines from natural gas reserves with relatively low methane concentrations. The invention permits the use of such reserves to be used to fuel gas turbines to generate electric power. As described, these reserves currently can be used only after the removal of impurities to produce suitable gas turbine fuel. Also as previously described, the latter current technology is capital intensive, and at current natural gas prices, economically unattractive. The process of the invention can remove the impurities necessary for protection of the environment, leaves inert gasses, such as carbon dioxide, in the fuel to maximize mass flow through the gas turbine, and uses hydrogen gas or shifts just enough methane to hydrogen gas to produce a gas fuel blend of hydrogen and methane gas that not only is an acceptable fuel for gas turbines, but the blend is effective for providing flame stability (such as providing the gas with at least 110 BTUs per standard cubic foot of gas) and for producing more power than a standard natural gas having from about 95+ to about 99+ volume percent methane. The method of the invention includes providing a natural gas comprising not more than about 40 percent methane on a volume basis and mixing the methane of the natural gas with hydrogen gas to provide a hydrogen enhanced methane/hydrogen gas blend (which also may be called a hydrogen enhanced natural gas) which has sufficient hydrogen to provide flame stability during burning. Thereafter, if required, the hydrogen enhanced methane/hydrogen gas blend is dehydrated to remove a sufficient amount of water to provide a flame stable hydrogen enhanced dehydrated methane/hydrogen gas blend. In an important aspect, the hydrogen enhanced methane/hydrogen gas blend has at least about 6 volume percent hydrogen. The flame stable hydrogen enhanced dehydrated methane/hydrogen gas blend then is used to fuel an electric power producing gas turbine. The method of the invention is effective for increasing the power output of a gas turbine by at least about 10 percent as compared to gas turbine using a standard natural gas which comprises from about 95 to about 99+ volume percent methane. In most cases, output may be increased by at least about 20 and up to about 30 percent with these latter limits being imposed by the mechanical design limitations of the gas turbine.

In an important aspect, a portion of the methane from natural gas is catalytically converted or reformed into hydrogen gas which then forms the hydrogen enhanced methane/hydrogen gas blend. The reactions which to obtain this conversion include:

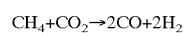

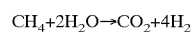

In another important aspect, prior to the conversion reaction, hydrogen sulfide and other acid components such as COS, RSH and RSSR are removed from the natural gas using a physical solvent to provide a sweet natural gas. A physical solvent selectively removes hydrogen sulfide and other acid gases, but minimizes the removal of carbon dioxide and other inert gases such as helium, argon, and nitrogen. In this aspect, the physical solvent is selected from the group consisting of methanol, a blend of dimethyl ethers of polyethylene glycol (molecular weight about 280), propylene carbonate (b.p. of 240° C., N-methyl-2-pryrrolidone (b.p. 202° C.), a blend of oligoethylene glycol methyl isopropyl ethers (b.p. about 320° C.), tri-n-butyl phosphonate (b.p. 180° C. at 30 mm Hg) and methyl cyano-acetate (b.p. 202° C.). The sweet natural gas is mixed with sufficient water to permit sufficient production of hydrogen from the methane to achieve flame stability or a BTU/Scf value of at least about 110. In this aspect, it is important that the hydrogen sulfide and other acid gases are removed prior to reforming a portion of the methane to hydrogen because the reformation is a catalyzed reaction where the catalyst may be poisoned by the hydrogen sulfide gas and other acid gases. Catalysts which are sensitive to the acid conditions and which may be used in this aspect of the invention include the C11 Series catalyst from United Catalyst Inc., R67 from Haldor Topsoe and G1-25 from BASF. High temperature "shift catalysts" for sweet natural gas generally are iron, chrome and copper. Low temperature "shift catalysts" for sweet natural gas generally are made from copper, zinc and aluminum.

In another important aspect, the reformation reaction is done under acid or sour conditions using catalysts such as a C25 Series catalyst from United Catalyst Inc., K8-11 catalyst from BASF and SSK catalyst from Haldor Topsoe. In general these catalysts are chrome molybdenum catalysts. In this aspect of the invention, the sour natural gas and water are mixed with the water being in amount which will result in a methane gas/water blend which will permit the formation or reformation of sufficient hydrogen gas to provide flame stability for the hydrogen rich methane/hydrogen gas blend which does not have in excess of 40 volume percent methane.

In another aspect, the natural gas reserves may have as low as 35, 25 or even less than 20 volume percent methane and still provide more power than pipeline quality methane. In practicing the invention, sufficient methane should be converted into hydrogen to produce a methane/hydrogen gas blend with at least 6 volume percent, and preferably from about 6 to about 10 volume percent hydrogen. This will produce a hydrogen enhanced methane/hydrogen gas blend with stable flammability that is very effective for fueling gas turbines for the generation of electric power.

BRIEF DESCRIPTION OF THE DRAWINGS

FIG. 1 is a flow plan illustrating the process of the invention.

DETAILED DESCRIPTION OF THE INVENTION

Referring to FIG. 1 natural gas having a methane concentration of not more than about 40 volume percent is moved from the well and treated with a physical solvent such as methanol, a blend of dimethyl ethers of polyethylene glycol, propylene carbonate, N-methyl-2-pyrrolidone, a blend of oligoethylene glycol methyl isopropyl ethers, tri-n-butyl phosphonate, and methyl cyano-acetate to remove hydrogen sulfide gas and other acid gas components without removing inert gases to provide a sweet natural gas with not more than about 40 volume percent methane. The sweet natural gas then is conveyed via line 1 to a zinc oxide guard bed 2 to prevent the emissions of hydrogen sulfide gas. The sweet natural gas is conveyed from the zinc oxide bed and mixed with water in line 3 to provide a methane gas/water blend. The gas/water blend is conveyed at about 70° F. and at about 355 psig in line 3 to a feed effluent heat exchanger 4 where the temperature of the sweet natural gas/water blend is raised to about 800° F. Sufficient water is mixed with the natural gas to permit sufficient conversion to hydrogen to provide flame stability to a hydrogen enhanced dehydrated methane/hydrogen gas blend when it is delivered to the gas turbine generator for the generation of power. After the sweet natural gas is mixed with water end heated in the feed effluent exchanger, the heated sweet natural gas/water blend is conveyed via line 5 at about 345 psig and about 800° F. to a heat recovery steam generator coil (HRSG coil) 6 to further raise the temperature of the sweet natural gas/water blend and provide a hot sweet gas/water blend having a temperature of about 950° F. in line 7. The hot sweet gas/water blend then is convoyed via line 7 to a reforming reaction chamber 8 at about 340 psig for converting a part of the methane in the sweet gas/water blend to a hydrogen enhanced methane/hydrogen gas/water blend. The methane in the sweet gas/water blend undergoes a catalyzed reaction to react the methane and water to produce hydrogen gas at at least about 700° F. and preferably from about 900 to about 950° F. and about 340 psig. Higher temperatures facilitate the conversion, while higher pressures adversely affect the conversion. Pressure should not exceed 1500 psig. After conversion of sufficient methane to hydrogen to provide at least about 6 volume percent hydrogen in the gas present after dehydration (hereinafter described), the hydrogen enhanced methane/hydrogen gas/water blend is conveyed back to the feed effluent exchanger via line 9 at about 855° F. and 335 psig to transfer beat to the water and methane gas entering the feed effluent exchanger. After the temperature of the hydrogen enhanced methane/hydrogen gas/water blend is reduced, it is conveyed via line 10 to a dehydrating knockout drum (KO drum) 12 to reduce the water content of the hydrogen enhanced methane/hydrogen gas blend, The dew point is lowered in the KO drum to permit water to condense and separate from the gas. Sufficient water is removed to permit flame stability and provide the gas with at least about 110 BTUs per standard cubic foot of gas. In general, from about 97 to about 99 or more weight percent of the water is removed from the gas. The water resulting from dehydrating the hydrogen enhanced methane/hydrogen gas/water blend is removed from the KO drum 12 via line 14 using condensate pump 16 and is conveyed back to the feed effluent exchanger 4 via line 18 at about 100° F. at about 500 psig. The dehydrated hydrogen enhanced methane/hydrogen gas blend which now has at least 6 volume percent hydrogen or sufficient hydrogen gas to provide flame stability is fed from the KO drum to a gas turbine generator via line 20 at about 100° F. at about 325 psig. There the gas has at least about 110 BTUs per standard cubic foot of gas and provides a stable flame for the gas turbine generator.

The same process may be used in utilizing a sour natural gas using a catalyst which will not be sensitive or poisoned by the acid gases in the natural gas. To keep the process compatible with the environment, however, at least some of the acid gases such as $H_2S$ may be removed at least in part.

In another embodiment not shown in the drawings, the power generated by the dehydrated hydrogen enhanced methane/hydrogen gas blend may be augmented by the injection of inert gases to increase the mass flowing through the gas turbine generator. In this aspect, the total amount of gas supplied as fuel still must have flame stability and have at least about 110 BTUs/Scf. In general, the inert gases are injected after the hydrogen enhanced methane gas blend is combusted in the turbine, but before the hot gas enters the expander of the turbine. Depending upon the amount of hydrogen gas in the methane, the output of the turbine may be raised by about 0.5 to about 9%. The power increase is about equal to the percentage of mass flow increase through the expander of the turbine.

The invention is illustrated by the following example.

EXAMPLE I

| GAS TURBINE PERFORMANCE | | | |
|---|---|---|---|
| | Units | No Aug | Power Aug |
| Site Conditions | | | |
| Ambient Temperature | ° F. | 60 | 60 |
| Ambient Pressure | psia | 11.57 | 11.57 |
| Ambient Relative Humidity | % | 60 | 60 |
| Inlet Pressure Drop | In $H_2O$ | 3.0 | 3.0 |
| Performance | | | |
| Gross Generator Output | kW | 156,100 | 157,100 |
| Heat Consumption (LHV) | Btu/h × $10^{-8}$ | 1,477.1 | 1,486.9 |
| Heat Rate (LHV) | Btu/kWh | 9,461 | 9,462 |
| Fuel 1 Conditions | | | |
| Composition | % Vol | | |
| Carbon Dioxide | | 62.5 | 62.5 |
| Hydrogen | | 10.0 | 10.0 |
| Nitrogen | | 5.4 | 5.4 |
| Methane | | 20.3 | 20.3 |
| Misc. | | 1.8 | 1.8 |
| LHV | Btu/Lb | 2,424.0 | 2,424.0 |
| | Btu/Scf | 212.5 | 212.5 |
| Fuel Gas Flowrate | lb/s | 169.3 | 170.4 |
| Pressure | psia | 325 | 325 |
| Temperature | ° F. | 80 | 80 |
| Power Aug Inj Conditions | | | |

-continued

GAS TURBINE PERFORMANCE

|  | Units | No Aug | Power Aug |
|---|---|---|---|
| Composition | % Vol | | |
| Carbon Dioxide | | 100.0 | 100.0 |
| Flowrate | lb/s | 0.0 | 4.0 |
| Pressure | psia | 285 | 285 |
| Temperature | ° F. | 300 | 300 |
| Exhaust Gas Conditions | | | |
| Exhaust Gas Flow | lb/s | 925.3 | 930.4 |
| Exhaust Gas Temperature | ° F. | 1,093.1 | 1,095.1 |
| Exhaust Gas Composition | % Vol | | |
| Carbon Dioxide | | 13.79 | 14.12 |
| Argon | | 1.07 | 1.07 |
| Nitrogen | | 65.78 | 65.53 |
| Oxygen | | 9.83 | 9.74 |
| Water | | 9.53 | 9.55 |
| Exhaust Pressure Drop | In $H_2O$ | 15.0 | 15.0 |
| Nox (Thermal) | ppmvd @ 15% $O_2$ | <10 | <10 |

What is claimed is:

1. A method for fueling a gas turbine with methane from natural gas reserves having sour natural gas with relatively low concentrations of methane, the method comprising:

mixing the sour natural gas and water to provide a hydrated sour natural gas, the water in the hydrated sour natural gas being in amount effective for permitting the catalytic conversion of a portion of the methane in the sour natural gas to hydrogen gas and effective for providing a flame stable dehydrated hydrogen enhanced natural gas, the sour natural gas having pot more than about 40 volume percent methane, catalytically converting a portion of the methane in the hydrated sour natural gas to hydrogen to provide a hydrated hydrogen enhanced natural gas, the catalytic conversion being effective for providing the flame stable dehydrated hydrogen enhanced natural gas;

dehydrating the hydrated hydrogen enhanced natural gas to provide the flame stable dehydrated hydrogen enhanced natural gas, which flame stable dehydrated hydrogen enhanced natural gas is not more than about 40 volume percent methane gas; and fueling the gas turbine with the dehydrated hydrogen enhanced natural gas.

2. The method for fueling a gas turbine as recited in claim 1 wherein the hydrated hydrogen enhanced natural gas is dehydrated in an amount effective for providing the dehydrated hydrogen enhanced natural gas with at least about 110 BTUs per standard cubic foot of gas.

3. The method as recited in claims 1 or 2 wherein the sour natural gas does not have more than about 35 volume percent methane gas and the dehydrated hydrogen enhanced natural gas comprises from about 6 to about 10 volume percent hydrogen gas.

4. The method as recited in claims 1 or 2 wherein the sour natural gas does not have more than about 20 volume percent methane gas and the dehydrated hydrogen enriched natural gas comprises from about 6 to about 10 volume percent hydrogen gas.

5. The method as recited in claim 2 where the method further includes injecting into the turbine an inert gas with the dehydrated hydrogen enhanced natural gas.

6. The method for fueling a gas turbine as recited in claim 1 wherein the dehydrated hydrogen enhanced natural gas comprises at least 6 volume percent hydrogen gas.

7. The method for fueling a gas turbine as recited in claim 1 wherein the step of catalytically converting a portion of the methane in the hydrated sour natural gas to hydrogen to provide a hydrated hydrogen enhanced natural gas comprises using a chrome/molybdenum catalyst.

8. The method as recited in claim 1 wherein the method further includes injecting into the turbine an inert gas with the dehydrated hydrogen enhanced natural gas.

* * * * *